(12) United States Patent
Rastegar et al.

(10) Patent No.: US 6,997,087 B2
(45) Date of Patent: *Feb. 14, 2006

(54) MANUALLY OPERATED IMPACT TOOL

(75) Inventors: Jahangir Rastegar, Stony Brook, NY (US); Thomas Spinelli, E. Northport, NY (US)

(73) Assignee: Omnitek Partners, LLC, Bayshore, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/658,949

(22) Filed: Sep. 10, 2003

(65) Prior Publication Data

US 2004/0055431 A1  Mar. 25, 2004

Related U.S. Application Data

(63) Continuation of application No. 10/121,480, filed on Apr. 11, 2002, now Pat. No. 6,679,143.

(60) Provisional application No. 60/283,581, filed on Apr. 13, 2001, provisional application No. 60/355,870, filed on Feb. 11, 2002.

(51) Int. Cl.
*B25B 19/00* (2006.01)

(52) U.S. Cl. ...................................... 81/466; 173/93.5

(58) Field of Classification Search ................. 81/466, 81/465, 635, 57.39, 60–63.2, 663, 463; 173/93, 173/93.5, 93.6, 93.7
See application file for complete search history.

(56) References Cited

U.S. PATENT DOCUMENTS

| | | | | |
|---|---|---|---|---|
| 3,156,309 A | * | 11/1964 | Swenson | 173/93 |
| 4,184,552 A | * | 1/1980 | Anderson | 173/93.5 |
| 4,243,109 A | * | 1/1981 | Anderson | 173/93.5 |
| 4,293,044 A | * | 10/1981 | Anderson | 173/93.5 |
| 4,474,091 A | * | 10/1984 | Russ | 81/463 |
| 4,794,830 A | * | 1/1989 | Gross et al. | 81/466 |
| 5,095,784 A | * | 3/1992 | Garver | 81/466 |

* cited by examiner

*Primary Examiner*—Hadi Shakeri

(57) ABSTRACT

A manually operated rotatable impact tool including: a driven member having means for retaining and driving a fastener about an axis, the driven member further having at least one impact stop offset from the axis; a driving member rotatably connected to the driven member for driving the driven member about the axis to loosen or tighten the fastener; an impact mass movable along a path in communication with the impact stop; a spring disposed in the path for storing energy upon rotation of the driving member; and an energy releasing mechanism for releasing the stored energy and allowing it to be at least partially transferred to the impact mass such that the impact mass accelerates and strikes the impact stop upon the release of the stored energy.

7 Claims, 16 Drawing Sheets

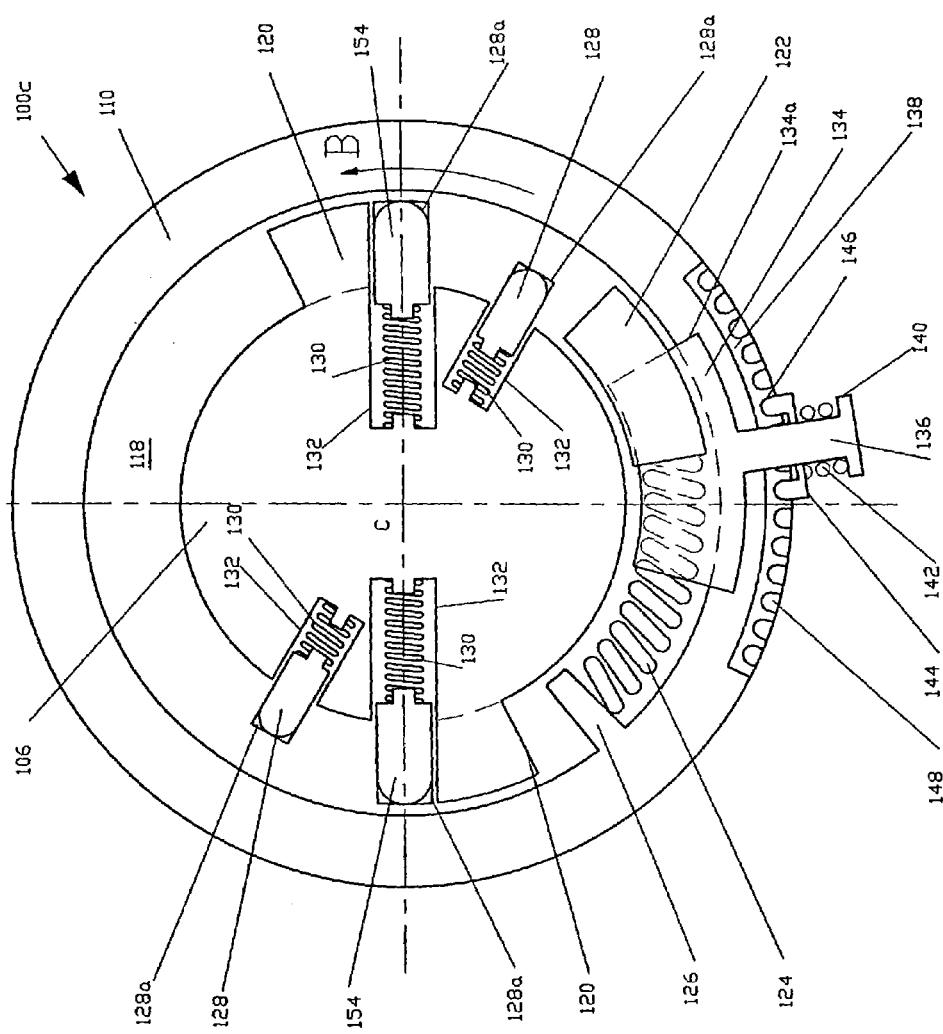

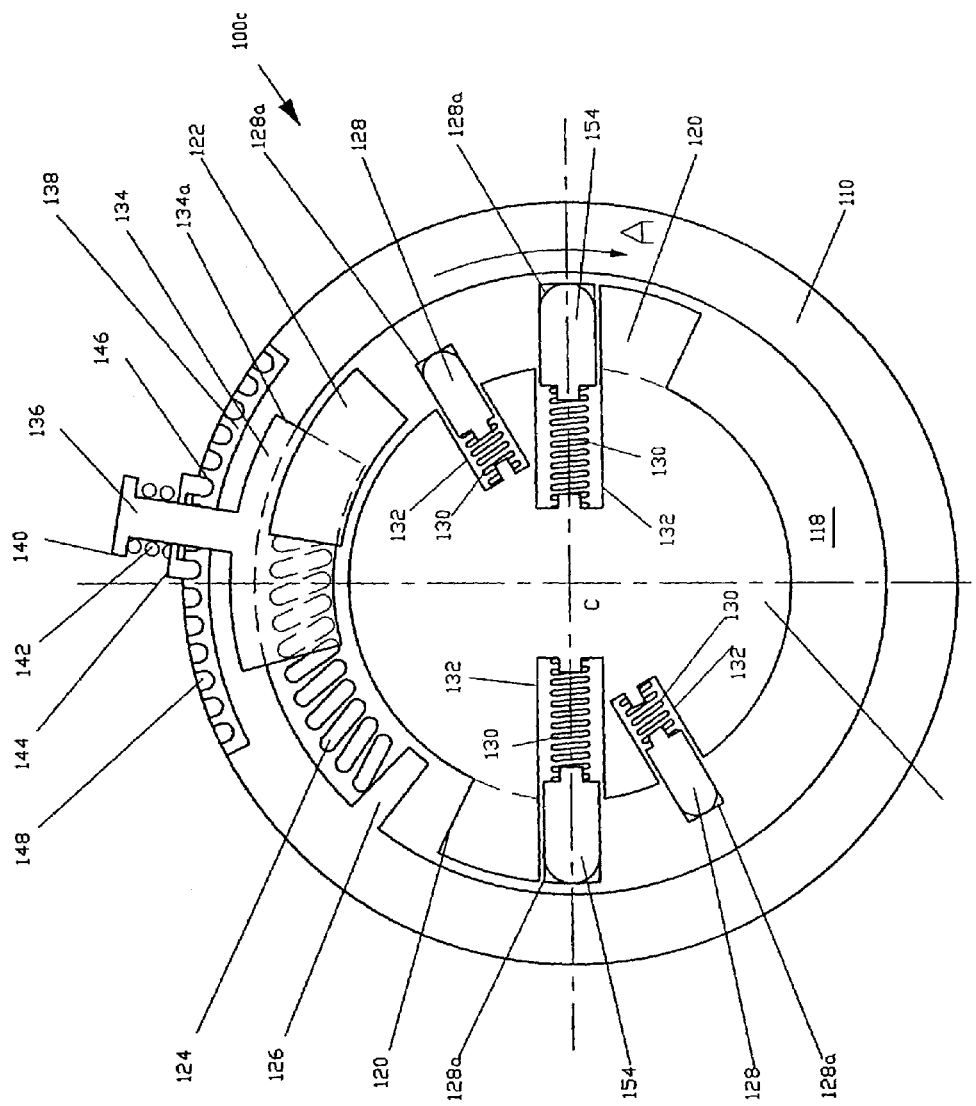

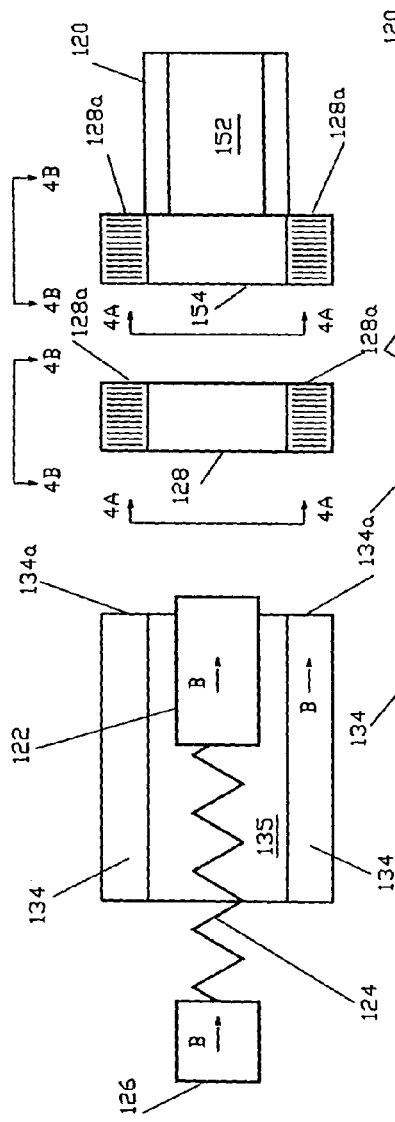

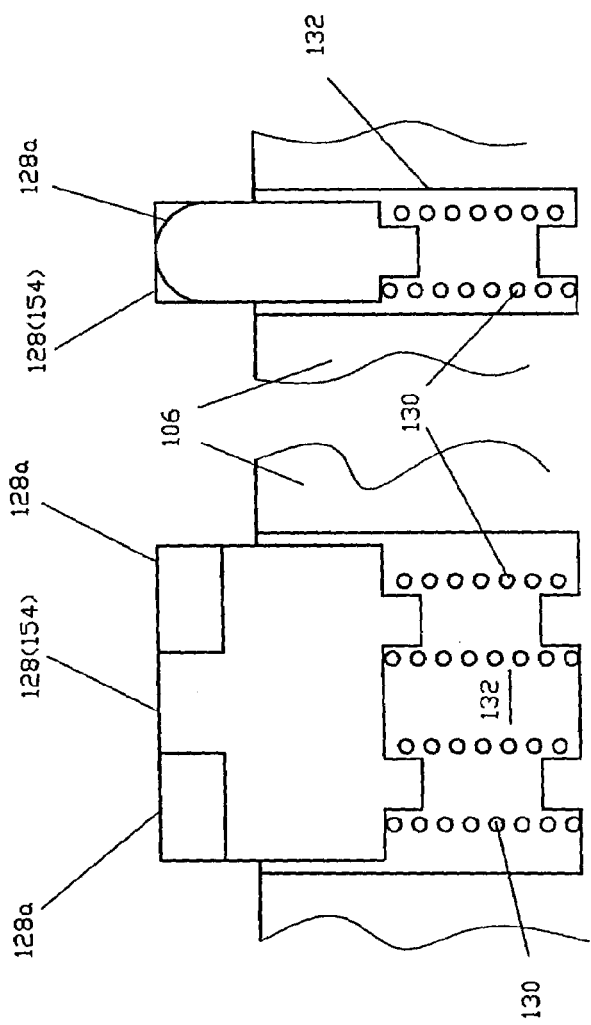

MANUALLY OPERATED IMPACT TOOL

CROSS REFERENCE TO RELATED APPLICATIONS

This application is a continuation of U.S. application Ser. No. 10/121,480 filed Apr. 11, 2002, now U.S. Pat. No. 6,679,143, which is a conversion of and claims the benefit of provisional applications 60/283,581 filed on Apr. 13, 2001 and 60/355,870 filed on Feb. 11, 2002, all of which are entitled "Manually Operated Impact Tool." The disclosures of 10/121,480; 60/283,581; and 60/355,870 are incorporated herein in their entirety by their reference.

BACKGROUND OF THE INVENTION

1. Field of the Invention

The present invention relates generally to impact tools and, more particularly, to manually operated impact tools such as an impact wrench which tightens or loosens a nut from a mating threaded shaft.

2. Prior Art

Impact based or impact assisted wrenches of the prior art operate using electric, pneumatic and in some cases hydraulic power to loosen and/or tighten fasteners such as nuts threaded on a mating treaded stud. The impact force generated by such wrenches greatly assists the loosening and tightening operation of such devices by generating a large impulsive force at the fastener interface. As the result, and in many cases due also to the generated stress waves that travels across the male and female fastener surfaces, such wrenches are operated with a significantly smaller operator effort. In certain situations, the large forces and/or moment and/or torque that has to be applied to a manually operated wrench to begin to open the fastener may cause its failure, particularly since such forces cannot usually be applied perfectly symmetrically, i.e., only in the direction that would open the fastener without unwanted added forces. For example, an operator applying a torque to a manually operated socket wrench to open a bolt may also apply a large shearing force and/or bending moment while exerting his maximum effort to open the fastener and thereby may cause the bolt to shear off during the procedure. Such failures seldom occur while using impact based wrenches since the operator does not have to exert his or her maximum effort in the above manner to operate the wrench.

It can safely be claimed that the relative ease with which impact based wrenches are operated to loosen or tighten various fasteners is well appreciated by their users. However, such wrenches require electric, pneumatic or some other type of generally electric based power in order to operate. In addition, such systems are generally heavy, bulky and expensive to be carried by the operator to all sites. This is particularly the case for the infrequent user such as a driver who may require the wrench in case of a flat tire to loosen and fasten the tire bolts or nuts.

A need therefore exists in the art for manually operated impact wrenches that are simple to use, light weight and inexpensive, particularly for the casual user and professional user who does not have access to a power source at the work site or who does not want to carry a heavy load to a site or may seldom face the need for its use.

SUMMARY OF THE INVENTION

Therefore it is an object of the present invention to provide a manually operated impact tool which offers the same advantages as the pneumatically and electrically powered impact tools of the prior art.

Accordingly, a manually operated rotatable impact tool is provided. The impact tool comprises: a driven member having means for retaining and driving a fastener about an axis, the driven member further having at least one impact stop offset from the axis; a driving member rotatably connected to the driven member for driving the driven member about the axis to loosen or tighten the fastener; an impact mass movable along a path in communication with the impact stop; a spring disposed in the path for storing energy upon rotation of the driving member; and energy releasing means for releasing the stored energy and allowing it to be at least partially transferred to the impact mass such that the impact mass accelerates and strikes the impact stop upon the release of the stored energy.

The fastener can be a hexagonal nut and the means for retaining and driving the hexagonal nut comprises a mating hexagonal recess for containing the hexagonal nut therein.

The driven member can be cylindrical where the driving member has a mating cylindrical recess for containing the driven member therein. The driving member can further have a lever for applying a torque to the driven member and hexagonal nut contained therein.

The impact tool can further comprise an abutment on the driving member, wherein the spring is a compression spring disposed in the path between the abutment and the impact mass.

The impact tool can further comprise adjustment means for varying a predetermined angular rotation of the impact mass and thereby the amount of energy stored in the impact mass at the time of releasing the impact mass to strike the impact stop.

Rotation of the driving member in a first angular direction can loosen the fastener. Rotation of the driving member in a first angular direction can tighten the fastener. Rotation of the driving member in a first angular direction can loosens the fastener and rotation of the driving member in a second angular direction opposite the first angular direction can tighten the fastener.

The impact mass can strike the impact stop upon the rotation of the driving member in a first angular direction and the impact mass can strike the impact stop subsequently by rotation of the driving member in a direction opposite the first angular direction followed by rotation of the driving member in the first angular direction. The impact mass can strike the impact stop upon the rotation of the driving member in a first angular direction and the impact mass can strike the impact stop subsequently by continued rotation of the driving member in the first angular direction.

Also provided is a manually operated rotatable impact tool comprising: a driven member having means for retaining and driving a fastener about an axis, the driven member further having at least one anvil surface offset from the axis; a driving member rotatably connected to the driven member for driving the driven member about the axis to loosen or tighten the fastener, the driving member having at least one anvil in cooperation with the at least one anvil surface; biasing means for biasing the at least one anvil surface and at least one anvil together; at least one cam for engaging a surface of the driving member and for moving the at least one anvil apart from the corresponding at least one anvil surface upon rotation of the cam and for releasing the driving member such that the spring pulls the at least one anvil to impact the corresponding at least one anvil surface to create a torque around the axis.

The cam can have two or more cam surfaces each of which engages the surface of the driving member.

The at least one cam can be rotatably disposed in the driven member. In which case, the at least one cam can comprise two cams, each rotatably disposed in the driven member and equally distanced from the axis.

Still provided is a manually operated rotatable impact tool comprising: a driven member having means for retaining and driving a fastener about an axis, the driven member further having at least one anvil offset from the axis, the anvil being rotatably disposed in the driven member into and out from a path; a driving member rotatably connected to the driven member for driving the driven member about the axis to loosen or tighten the fastener; an impact mass movable along the path in communication with the at least one anvil; a flexible member connecting the driving member and impact mass for storing energy upon rotation of the driving member; and energy releasing means for releasing the stored energy and allowing it to be at least partially transferred to the impact mass such that the impact mass accelerates and strikes the at least one anvil upon the release of the stored energy while the at least one anvil is rotated into the path.

The at least one anvil can comprise first and second anvils, each of the first and second anvils being rotatably disposed in the driven member into an out from the path, the impact mass being held against the first anvil upon rotation of the driving member due to a biasing force exerted by the flexible member, wherein the energy releasing means comprises a follower plate rotatably disposed in the driven member, the follower plate having at least one arm for engaging the first anvil and rotating the first anvil out from the path causing the impact mass to rotate and impact the second anvil. The follower plate can further have at least one leg which when rotated does not interfere with the first and second anvils and further comprising a spring connecting the leg to the impact mass for biasing the impact mass toward one of the first or second anvils.

The driven member can comprises a shell having a wall, the at least one anvil being rotatably disposed in the wall.

The impact wrench can further comprise a biasing means for biasing the at least one anvil into the path.

BRIEF DESCRIPTION OF THE DRAWINGS

These and other features, aspects, and advantages of the apparatus of the present invention will become better understood with regard to the following description, appended claims, and accompanying drawings where:

FIG. 2C illustrates a sectional view of a third configuration of an impact wrench of FIG. 1 taken along line 2—2 of FIG. 1 in which the impact wrench is of a loosening configuration and where the impact mass strikes the impact stop upon the rotation of the driving member in a first angular direction and the impact mass strikes the impact stop subsequently by continued rotation of the driving member in the first angular direction.

FIG. 2D illustrates a sectional view of a fourth configuration of an impact wrench of FIG. 1 taken along line 2—2 of FIG. 1 in which the impact wrench is of a tightening configuration and where the impact mass strikes the impact stop upon the rotation of the driving member in a first angular direction and the impact mass strikes the impact stop subsequently by continued rotation of the driving member in the first angular direction.

FIGS. 3A–3F illustrate the positions of the driving member, impact mass, impact stop, stop mover, and movable stop plates at different times throughout the angular movement of the driving member as if the angular movement were linear.

FIG. 4A illustrates a front view of either of the movable stop plates as viewed about lines 4A—4A of FIG. 3A.

FIG. 4B illustrates a side view of either of the movable stop plates as viewed about lines 4B—4B of FIG. 3A.

FIG. 5 illustrates a sectional view of the impact stop as taken along line 5—5 of FIG. 3E.

DETAILED DESCRIPTION OF THE PREFERRED EMBODIMENT

Although the present invention is applicable to numerous types of impact tools, it is particularly useful in the environment of impact wrenches. Therefore, without limiting the applicability of the present invention to impact wrenches, it will be described in such environment.

Figure 1:
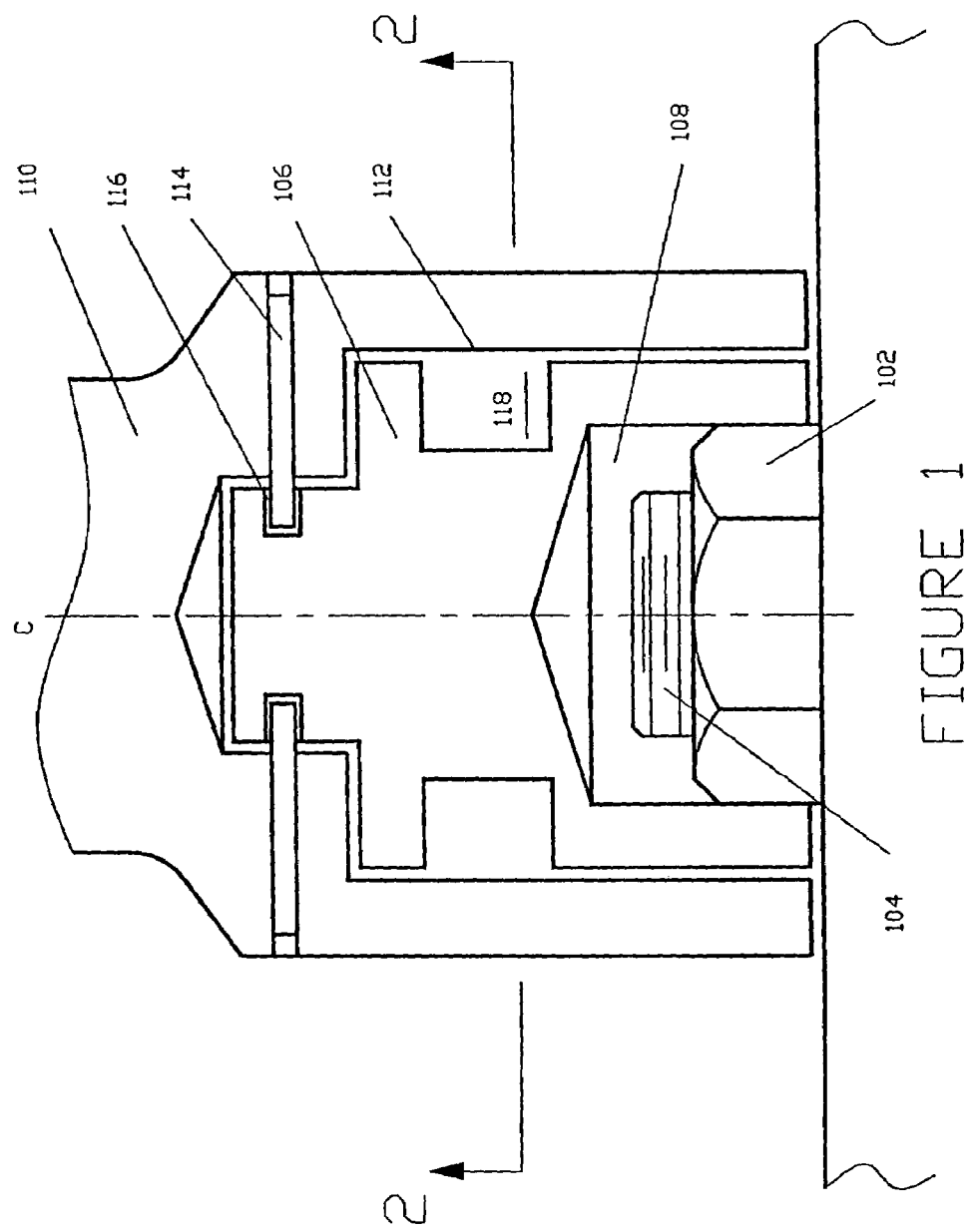
FIG. 1 illustrates a partial side sectional view of a general representation of the impact tool of the present invention.

Referring now to FIG. 1, there is illustrated a general representation of the impact tool 100 of the present invention configured to be adapted to a hexagonal nut 102 for tightening and/or loosening the nut 102 from a mating threaded stud 104. The hexagonal nut 102 is illustrated by way of example only and not to limit scope of the present invention. It should be appreciated by those skilled in the art that the impact tool 100 of the present invention can be adapted to any fastener that can be tightened and/or loosened, such as various types of screws, nuts, and bolts, and can even be adapted to open screw-on jar lids and the like. As will be apparent to those skilled in the art, the impact tools 100 of the present invention are manually operated without the assistance of pneumatic or electrical power.

The impact tool 100 has a driven member 106 that has means for retaining and driving a fastener about an axis C. In the case where a hexagonal nut 102 is the fastener, the means for retaining and driving the hexagonal nut comprises a mating hexagonal recess 108 which is substantially shaped and sized to accommodate the hexagonal nut 102 therein. Axis C is shown as being centrally located about the driven member 106, however, the axis can be offset therefrom without departing from the scope or spirit of the present invention.

The impact tool 100 further having a driving member 110 rotatably connected to the driven member 106 for driving the driven member 106 about the axis C to loosen or tighten the hexagonal nut 102. Preferably, the driven member 106 is cylindrical and housed in a mating cylindrical cavity 112 in the driving member and retained therein so as to rotate. Preferably, the driven member 106 is retained in the cavity 112 by way of one or more pins 114 which fit into an annular slot 116 on the driven member 106. The driven member 106 may also be rotatably retained in the cavity 112 by way of a retaining ring or by other methods known in the art. The driving member 110 generally has a lever or handle connected thereto which is used to apply a torque and gain a mechanical advantage for applying a tightening or loosening force to store energy, preferably in a spring. The lever can be in the form of a "t" handle or a single cantelevered handle or any other type of handle in which a torque can be applied to store energy in the spring.

The driven member 106 preferably has a path 118, which is preferably annular, to couple the driven and driving members 106, 110 by way of elements for imparting an impact force therebetween. The elements and configuration thereof for imparting the impact force between the driven and driving members 106, 110 vary with the configuration of the impact tool and are not shown in FIG. 1, FIG. 1 being a general representation of the several configurations of the impact tools of the present invention.

Figure 2A:
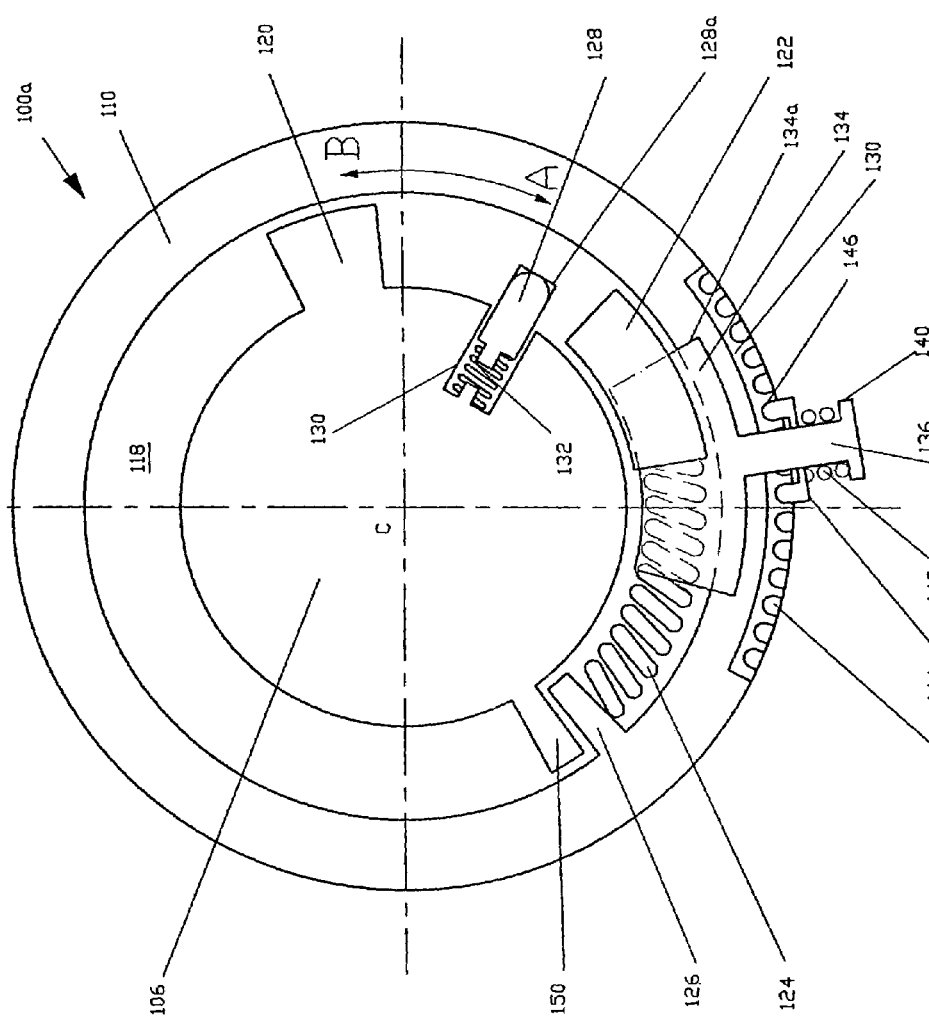
FIG. 2A illustrates a sectional view of a first configuration of an impact wrench of FIG. 1 taken along line 2—2 of FIG. 1 in which the impact wrench is of a loosening configuration and where the impact mass strikes the impact stop upon the rotation of the driving member in a first angular direction and the impact mass strikes the impact stop subsequently by rotation of the driving member in a direction opposite the first angular direction followed by rotation of the driving member in the first angular direction.

The elements for imparting the impact force between the driven and driving members 106, 110 will now be described below with reference to FIGS. 2A–2D. Referring first to FIG. 2A, there is illustrated a first configuration of the impact tool of the present invention in which the impact tool, generally referred to by reference numeral 100a, is in a loosening configuration and operates by rotating the driving member 110 in a first angular direction B to impart an impact force to the fastener 102 and thereafter rotating the driving member 110 in an angular direction A opposite from the angular direction B before repeating the rotation in the direction A. That is, the driving member is repeatedly rotated back and forth along angular directions A and B until the fastener 102 is adequately loosened.

In the first configuration of the impact tool 100a of the present invention, the driven member 106 further has an impact stop 120 offset from the axis C and in the path 118. An impact mass 122 is also provided in the path 118 and is movable along the path in communication with the impact stop 120. Also provided are energy storing means for storing potential energy upon rotation of the driving member 110 relative to the driven member and energy releasing means for releasing the stored potential energy such that the impact mass 122 is accelerated to a certain velocity at which time it strikes the impact stop 120.

The energy storing and releasing means preferably comprises a spring 124 for biasing the impact mass 122 away from an abutment 126 on the driving member 110. The spring 124 is preferably a compression spring disposed in the path 118 between the abutment 126 and the impact mass 122. Those skilled in the art will realize that other types of springs, such as tension springs and torsion springs can also be utilized to bias the impact mass 122 away from the abutment 126. The energy storing and releasing means preferably further comprises a movable stop plate 128 biased into the path 118 and movable out from the path 118. The movable stop plate 128 is preferably biased into the path 118 by way of compression springs 130 disposed between a bottom portion of the movable stop plate and a bottom of a slot 132 which houses the movable stop plate 128. The movable stop plate 128 is preferably a plate that slides inside the slot 132 while being biased into the path 118 to block the movement of the impact mass 122. Those skilled in the art will appreciate that the movable stop plate 128 may be rotatable attached to the driven member by a rotational joint and biased into the path 118 of motion of the impact mass 122 by linear, torsional, or flexing springs in bending. The sliding or the rotational joints to move the movable stop plate 128 may be living joints.

The energy storing and releasing means preferably further comprises a stop mover 134 which rotates with the driving member 110 for engaging and moving the movable stop plate 128 from the path 118 upon a predetermined angular rotation of the driving member 110. Thus, rotation of the driving member 110 forces the impact mass 122 to abut the movable stop plate 128 and compress the spring 124 until the stop mover 134 moves the movable stop plate 128 from the path 118 when the driving member 110 is rotated the predetermined angular rotation thereby releasing the impact mass 122 to accelerate and strike the impact stop 120 which transmits an impact force to the fastener 102.

The stop mover 134 preferably has a channel 135 (shown schematically in FIGS. 3A–3F) therein which protrudes into the path 118 and accommodates the impact mass 122 therein. The impact mass 122 is biased away from the abutment 126 and is further towards the impact stop 120 then is a leading edge 134a of the stop mover 134. This permits the impact mass 122 to contact the movable stop plate 128 prior to the leading edge 134a of the stop mover 134 to thereby compress the spring 124 and store potential energy for transfer to the impact mass 122. When the stop mover 134 reaches the movable stop plate 128, it pushes it into the slot 132 and out from the path 118 thereby allowing the potential energy stored spring 124 to begin to be transferred to the impact mass 122 in the form of kinetic energy and impact the impact stop 120. To facilitate the moving of the movable stop plate 128 out from the path 118, the movable stop plate 128 has rounded ends 128a as shown in FIGS. 4A and 4B.

Referring back to FIG. 2A, stop mover 134 can be rigidly attached to the driving member 110 or have an adjustment means for varying the predetermined angular rotation and thereby the amount of potential energy stored in the spring 124 at the time of releasing the impact mass 122 to strike the impact stop 120. Preferably, the adjustment means comprises movably mounting the stop mover 134 to the driving means 110 such that its position relative to the movable stop plate 128 is changeable over a predetermined range. That is, the distance between the leading edge 134*a* of the stop mover 134 and the movable stop plate 128 can be adjusted such that the spring 124 can be compressed more or less at the time that the stop mover 134 pushes the movable stop plate 128 out from the path 118 thereby varying the amount of potential energy stored in the impact mass 122. The adjustment means preferably further has a locking means for locking the stop mover 134 in one of a plurality of positions within the predetermined range.

The adjustment and locking means preferably comprises the stop mover 134 having a stud 136 which travels in a slot 138 in a side of the driving member 110. The stud further has a lip 140 for retaining a compression spring 142 on the stud 136. A locking member 144 is disposed on the stud and has fingers 146 which mate with corresponding finger holes 148 which line the slot 138. The fingers 146 of the locking member 144 are biased from the lip 140 and into corresponding finger holes 148 by the compression spring 142. By way of the adjustment and locking means, the fingers 146 of the locking member 144 can be pulled out of engagement with the finger holes 148 and the stop mover can be moved to one of a plurality of positions within the predetermined range by sliding the stop mover 134 to its desired location. The stop mover can then be locked in the desired location by releasing the locking member 144 thereby engaging the fingers 146 with another set of corresponding finger holes 148.

A further abutment 150 is preferably provided on the driven member 106 such that the driving member 110 can be rotated in direction A until the abutment 126 on the driving member 110 strikes the further abutment 150 before repeating the rotation in direction B. Rotation of the driving member 110 in direction A until such is prevented by the coincidence of the abutments 126 and 150 and provides assurance that a repetitive rotation in direction B can be resumed. Furthermore, the further abutment 150 can be used to provide a tightening of the fastener 102 when the driving member is rotated in direction A, however, the tightening will not be assisted by an impact force.

Figure 2B:
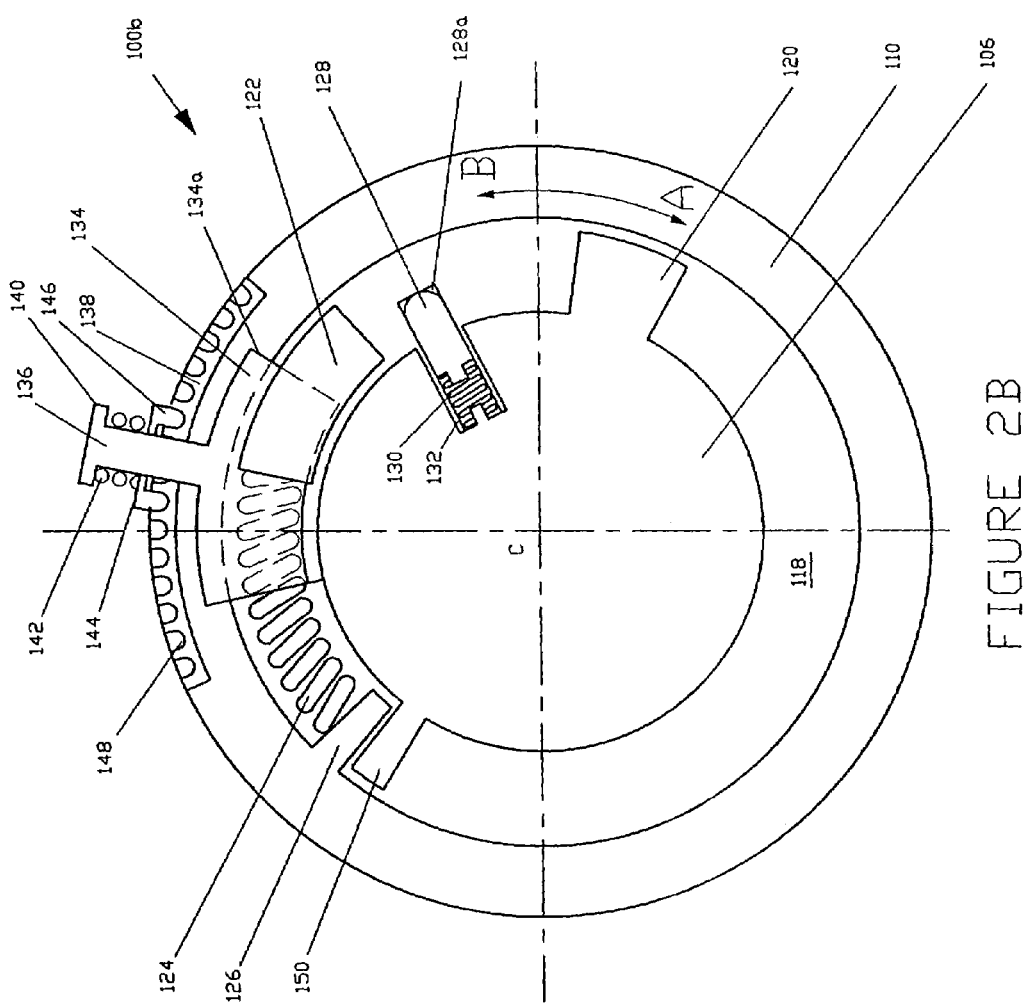
FIG. 2B illustrates a sectional view of a second configuration of an impact wrench of FIG. 1 taken along line 2—2 of FIG. 1 in which the impact wrench is of a tightening configuration and where the impact mass strikes the impact stop upon the rotation of the driving member in a first angular direction and the impact mass strikes the impact stop subsequently by rotation of the driving member in a direction opposite the first angular direction followed by rotation of the driving member in the first angular direction.

Referring now to FIG. 2B, in which like reference numerals denote like features, there is illustrated a second configuration of the impact tool of the present invention in which the impact tool, generally referred to by reference numeral 100*b*, is in a tightening configuration and operates by rotating the driving member 110 in a first angular direction A to impart an impact force to the fastener 102 and thereafter rotating the driving member 110 in an angular direction B opposite from the angular direction A before repeating the rotation in the direction B. That is, the driving member 110 is repeatedly rotated back and forth along angular directions B and A until the fastener 102 is adequately tightened. Those skilled in the art will recognize that impact tools 100*a* and 100*b* contain the same elements and their configurations are merely mirrored from each other.

Referring now to FIG. 2C, in which like reference numerals denote like features, there is illustrated a third configuration of the impact tool of the present invention, in which the impact tool, generally referred to by reference numeral 100*c*, is in a loosening configuration and operates by rotating the driving member in a first angular direction B and continuing rotation of the driving member in the first angular direction B. That is, instead of the repetitive back and forth motion of the impact tools of FIGS. 2A and 2B, impact tool 100*c* of FIG. 2C operates with a continued motion in an angular direction.

In addition to the elements previously described with regard to impact tools 100*a* and 100*b*, the impact stops 120 of impact tool 100*c* have channels 152, seen more clearly in FIG. 5, which permits the abutment 126 and impact mass 122 to pass through. The impact stops 120, as well as the abutment 126 and impact mass 122 are sized such that they pass within the channel 135 of the stop mover 134. Furthermore, since impact tool 100*c* operates by continued rotation in a single angular direction, the further abutment 150 is eliminated. Lastly, in impact tool 100*c*, a second movable stop plate 154, substantially similar to the movable stop plate 128 (hereinafter referred to as the first movable stop plate 128) shown in FIGS. 4A and 4B, is provided adjacent to the impact stop 120. The purpose of the second movable stop plate 154 will become apparent in the description of the operation of impact tool 100*c*.

Although, the impact tool 100*c* can operate with one set of first and second movable stop plates 128 and 154 and impact stop 120, it is preferable to have more than one such set, and more preferable to have two impact stops 120, each having the channel 152, and each having corresponding first and second movable stop plates 128 and 154 both of which are biased into the path 118 and movable out from the path 118.

Figure 3D:
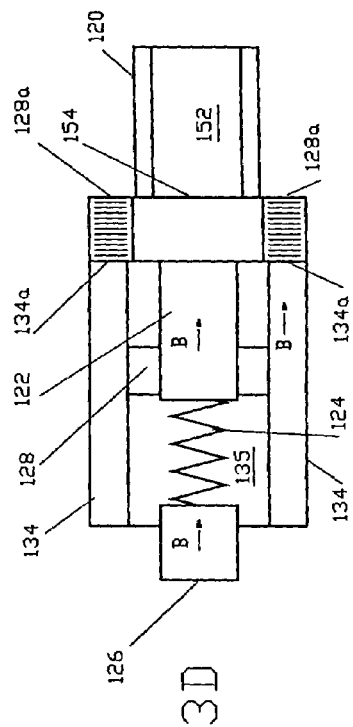

The operation of impact tool 100*c* will now be described with reference to FIGS. 3A to 3F in which the annular path 118 is shown as a linear path for the sake of simplicity. Referring first to FIG. 3A, the positions of the elements contained in the path 118 is substantially that as is shown in FIG. 2C. Upon rotation of the driving member 110 in angular direction B (which is approximated in FIGS. 3A–3F as linear direction B) the abutment 126 connected thereto drives the impact mass 122 through the energy storage spring 124 to contact the first movable stop plate 128 and compress the energy storage spring 124 as shown in FIG. 3B. As discussed previously with regard to impact tool 100*a*, the amount the spring 124 compresses can be varied by varying the location of the stop mover 134 relative to the driving member 110 with the adjustment and locking means. Upon further rotation in Direction B, the stop mover 134 which is fixedly connected to the driving member 110, engages the rounded ends 128*a* of the first movable stop plate 128 and pushes it out from the path 118 and into slot 132 which releases the potential energy stored in the spring 124, and accelerates the impact mass 122 to a certain velocity where the impact mass 122 strikes the second movable stop plate 154 as shown in FIG. 3C. Since the second movable stop plate 154 is adjacent and preferably touching the impact stop 120, the impact from the impact mass 122 is transferred to the impact stop 120, the driven member 106 connected thereto, and the fastener 102 retained therein.

Figure 3E:
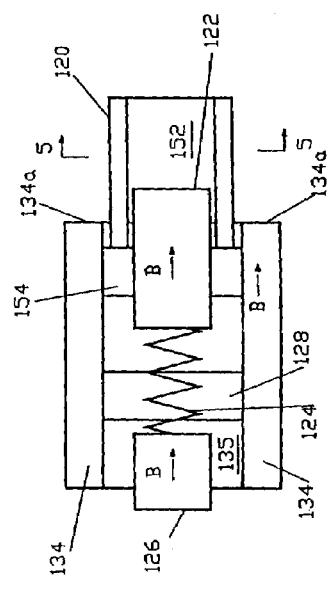
Figure 3F:
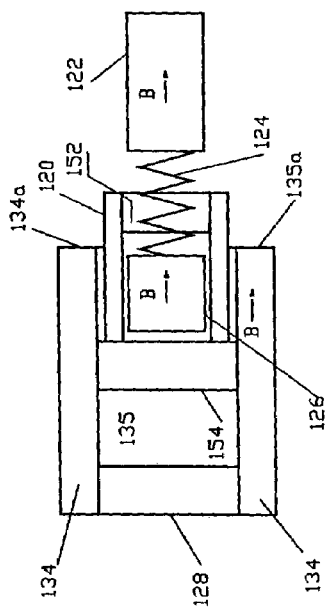

Upon further rotation in direction B, the stop mover 134 contacts the second movable stop plate 154 engages the rounded ends 128*a* thereof and pushes it out from the path 118 and into slot 132 as shown in FIGS. 3D and 3E. Continuing the rotation of the driving member in direction B, the abutment 126 connected thereto drives the impact mass 122 through the channel 152 of the impact stop 120 as shown in FIG. 3E and eventually also drives the abutment 126 through the channel 152 of the impact stop 122 as shown in FIG. 3F. Continued rotation of the driving member 110 drives the stop mover 134 out of engagement with the first and second movable stop plates 128 and 154 where the springs 130 bias the first and second movable stop plates 128 and 154 back into the path 118 to reset them for the next time the abutment 126, impact mass 122, and stop mover 134 are driven around the path 118.

Referring now to FIG. 2D, in which like reference numerals denote like features, there is illustrated a fourth configuration of the impact tool of the present invention in which the impact tool, generally referred to by reference numeral 100d, is in a tightening configuration and operates by rotating the driving member in a first angular direction A and continuing rotation of the driving member in the first angular direction A. Those skilled in the art will recognize that impact tools 100c and 100d contain the same elements and their configurations are merely mirrored from each other. Thus, the operation of impact tool 100d is substantially similar to that previously described with regard to impact tool 100c with the exception of rotation in direction A which is opposite to that of direction B.

Figure 6:
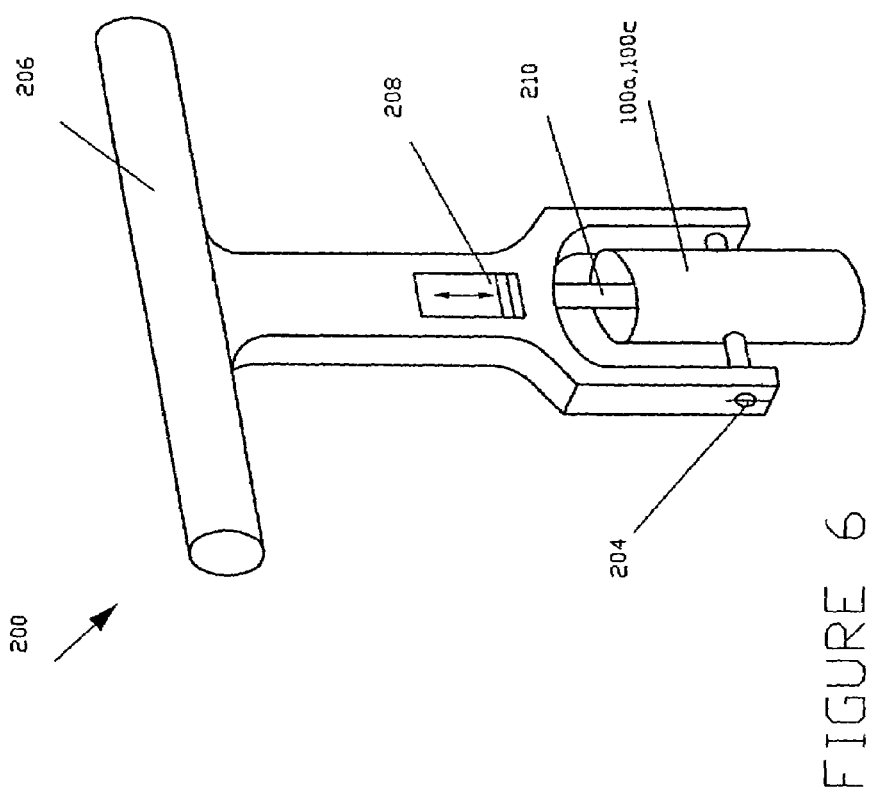
FIG. 6 illustrates an impact tool in the form of a wrench having tightening and loosening portions, switching means for switching between the loosening and tightening portions, and locking means for locking the either of the loosening and tightening portions to communicate with a fastener.

Referring now to FIG. 6, there is illustrated another embodiment of the impact tool of the present invention, generally referred to by reference numeral 200. The impact tool 200 of FIG. 6 includes both a loosening configuration impact tool 100a, 100c and a tightening impact tool 100b, 100d, either of which can be utilized to tighten or loosen a fastener 102. Preferably the impact tool 200 has a switching means for switching between the loosening and tightening portions. The switching means preferably comprises housing the loosening and tightening impact tools 100a, 100c; 100b, 100d at opposite ends of a common body 202 and providing rotation of the common body 202 in one of two positions such that in one position the loosening portion 100a, 100c is able to communicate with the fastener 102 and in the other position the tightening portion 100b, 100d is able to communicate with the fastener 102. The means for providing rotation preferably comprises a pin 204 disposed at a central location of the common body 202 which permits rotation of the common body 202 relative to a handle 206.

Impact tool 200 preferably further comprises a locking means for locking the common body 202 in one of the two positions. The locking means preferably comprises a slide 208 movable between locked and unlocked positions. The slide preferably has an end 210 which engages a portion of the common housing 202 when in the locked position to prevent rotation of the common housing 202.

Figure 7:
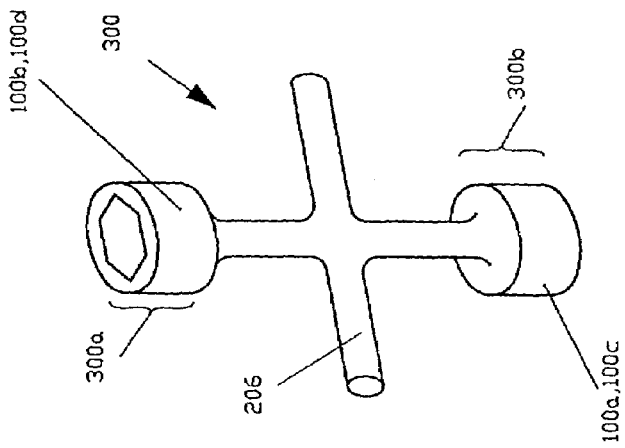
FIG. 7 illustrates an impact tool in the form of a wrench having tightening and loosening portions, wherein the loosening and tightening portions are provided at opposite ends of the impact tool.

Referring now to FIG. 7, there is illustrated an impact tool, referred to generally by reference numeral 300, which is similar to impact tool 200 in that it includes both a loosening configured impact tool 100a, 100c and a tightening configured impact tool 100b, 100d. However, instead of a switching means for switching between the tightening 100b, 100d and loosening 100a, 100c impact tools provided thereon, the tightening 100b, 100d and loosening 100a, 100c impact tools are merely provided at different locations on the tool 300, such as on opposite ends 300a, 300b as is illustrated in FIG. 7.

In yet another impact wrench of the present invention that can both tighten and loosen a fastener using impact forces. In this impact wrench, a common driven member is driven by a loosening driving member and a tightening driving member stacked upon each other and disposed around the common driven member. A means is then provided to engage the common driven member to one of the tightening or loosening driving member while disengaging the other. Such a means can be a slide member that is slidable between two positions. In one position, an extension member on the slide member engages one of the driving members and disengages from the other. Those skilled in the art will appreciate that other such means can be used without departing from the scope or spirit of the present invention.

In yet another implementation of the impact wrench of the present invention, which is similar in construction to the impact wrenches previously described, except the driven member includes a through hole hexagonal recess which can retain and drive the fastener. Thus, the fastener can be retained in the through hole hexagonal recess from either a first side or a second side of the driven member. Those skilled in the art will appreciate that impact wrench can then be used to either tighten or loosen the fastener depending upon the side in which the fastener is retained in the through hole hexagonal recess. If the configuration of impact wrench were used in this impact wrench, retaining the fastener in the through hole hexagonal recess from first side would allow the loosening of the fastener while turning the impact wrench over and retaining the fastener in the through hole hexagonal recess from a second side would allow tightening of the fastener.

The operation of the impact tools have been described in which the driving member both rotate about a single axis. Such designs are preferable but not necessary. Those skilled in the art will appreciate that the axis of rotation of the driving and/or driven members may be different and/or not fixed. One or both motions may even be purely translational. Such designs are obtained for example by using a cam mechanism or a linkage mechanism or the like to vary the center of rotation(s). One of the advantages of such designs is that as the driving member is forced by the operator to rotate and/or translate and as more potential energy is stored in the spring(s) (i.e., as the resistance of the spring to the applied force (torque or moment) is increased) the operator's leverage is also increased.

Figure 8:
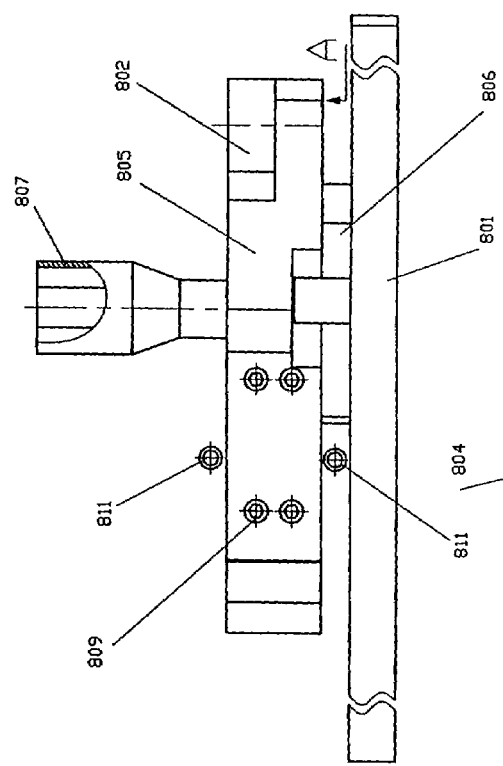
FIG. 8 illustrates a plan view of a first embodiment of a manually operated rotatable impact wrench of the present invention.
Figure 9:
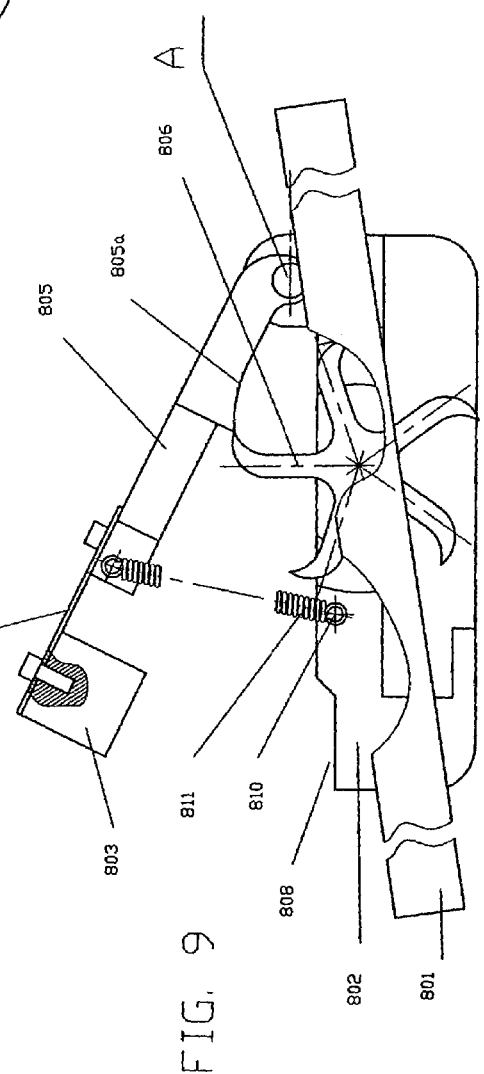
FIG. 9 illustrates a side view of the manually operated rotatable impact wrench of FIG. 8.

Referring now to FIGS. 8 and 9, there is illustrated a first embodiment of the manually operated rotatable impact wrench (hereinafter "impact wrench"), generally referred to by reference numeral 800. The impact wrench 800 includes a driven member 802, which in the preferred implementation is a solid piece of metallic material, such as forged tool steel. The driven member has a means for holding a fastener rigidly attached thereto, such as a lug wrench 807. The driven member 802 and lug wrench 807 can be integrally formed or separately formed and fastened together, such as by welding. The driven member has at least one anvil surface 808.

A driving member 805 is rotatably disposed on the driven member 802, preferably, at point A by a pin, shoulder screw, or the like. The driving member 805 includes at least one impact mass 803 which corresponds to the anvil surface 808 when the driven member 802 and driving member 805 are in their closed position (not shown). In the first embodiment of the impact wrench 800, the impact mass 803 is fastened to the driving member 805 by a spring plate 804. The spring plate 804 generally is allowed to flex so as to increase the efficiency of the impact of the impact mass 803 against the anvil surface 808. The driving member 805 and impact mass 803 are preferably metallic, such as forged tool steel. The driven member 802 and driving member 805 are biased together into the closed position, preferably by at least one extension spring 811, and more preferably two extension springs 811, one on each side of the driving member 805 and driven member 802.

A lifter cam 806 is rotatably disposed on the driven member 802 and has at least one finger 806a for engaging a corresponding cam surface 805*a* on the driving member 805. In the first embodiment illustrated in FIG. 9, the lifter cam 806 has five such fingers 806*a*. The lifter cam 806 is preferably directly connected to a handle 801 such that rotation of the handle 801 results in a corresponding rotation of the lifter cam 806. Alternatively, the lifter cam 806 and handle can be connected through a linkage or gearing system to provide the desired rotation of the lifter cam 806.

The operation of the impact wrench 800 will now be described with reference to FIGS. 8 and 9 and although the same is described in terms of loosening a lug nut fastener (not shown), it can also be configured to tighten a lug nut fastener or loosen and/or tighten any other types of fasteners. Alternatively, a similar configuration can be used to provide an impact facilitate cutting a wire or branch or other similar wire-type members. When the handle 801 is rotated in a counter-clockwise direction one of the fingers 806*a* of the lifter cam 806 engages the cam surface 805*a* near the pivot point A. As the lifter cam 806 continues to rotate in the counter-clockwise direction, the driving member 805 is forced to rotate about point A against the biasing force of the springs 811 until the finger 806*a* reaches the end of the cam surface 805*a*, as is shown in FIG. 8. Continued rotation of the handle 801 and the lifter cam 806 rotated therewith causes the driving member 805 to accelerate towards the driven member 802 due the energy stored in the extension springs 811. The driving member 805 continues its acceleration until the impact mass 803 impacts the anvil surface 808. The impact force from the impact is transferred through the driven member 802 and to the lug wrench 807 rigidly connected thereto. This operation is repeated until the lug nut or other fastener is loosened. Since the lifter cam 806 in the impact wrench of the first embodiment has five fingers 806*a*, there will be five impacts per revolution of the handle 801.

Figure 12:
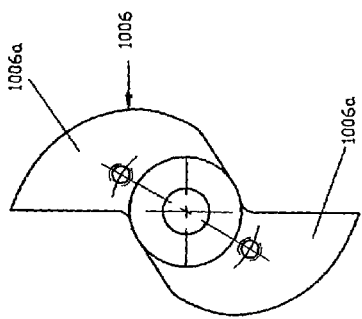
FIG. 12 illustrates an alternative lifter cam for use in either of the first and second embodiments of FIGS. 8 and 10, respectively.
Figure 11:
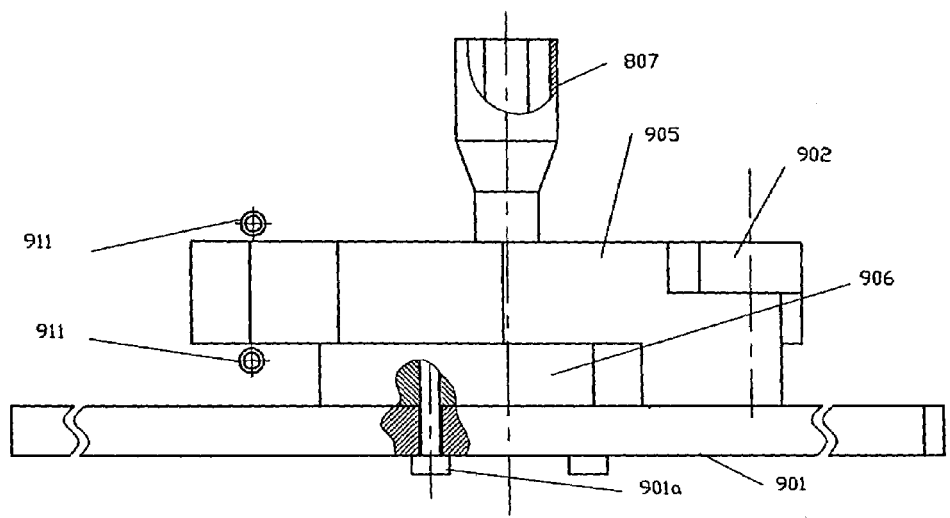
FIG. 11 illustrates a side view of the manually operated rotatable impact wrench of FIG. 10.
Figure 10:
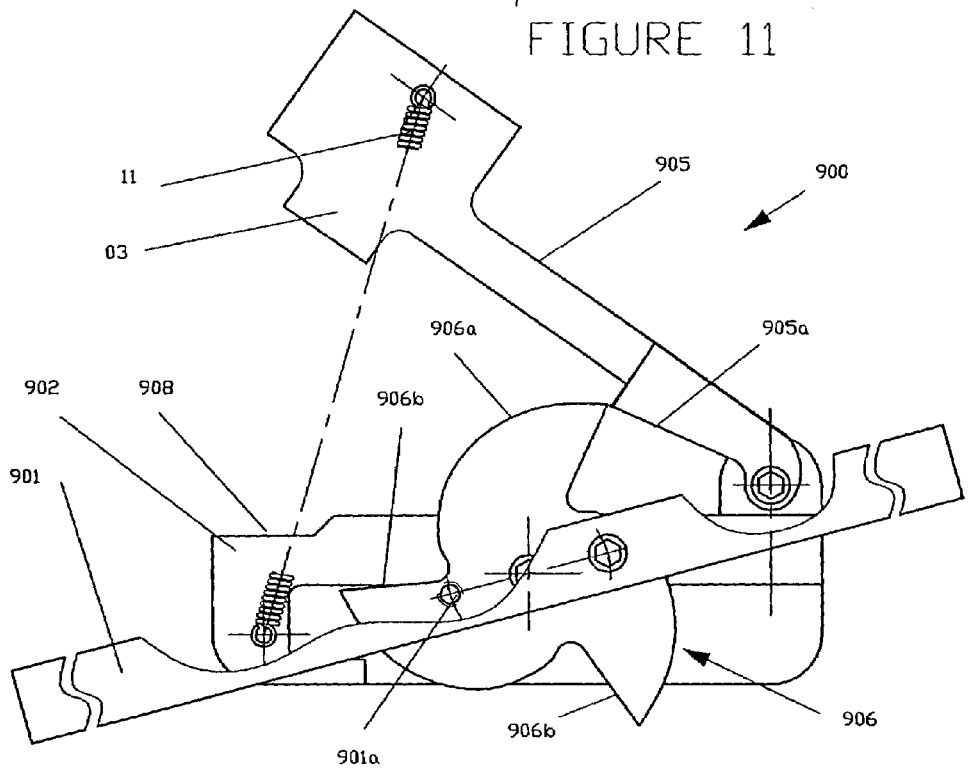
FIG. 10 illustrates a plan view of a second embodiment of a manually operated rotatable impact wrench of the present invention.

Referring now to FIGS. 10 and 11 there is illustrated a second embodiment of the impact wrench of the present invention, generally referred to by reference numeral 900. In FIGS. 10 and 11, like reference features are represented by reference numbers in a 900 series of numbers. Thus, handle 901 is similar to handle 801. Impact wrench 900 is similar to impact wrench 800 except that the impact mass 903 is rigidly connected to the driving member 905, and is preferably integrally formed therewith. Furthermore, lifter cam 906 has three fingers 906*a* and is freely rotatable independent of the handle 901. That is, the handle 901 and lifter cam 906 rotate independently and are thus not rigidly connected to each other. However, rotation of the handle 901 causes the lifter cam 906 to rotate. Handle 901 includes a pin 906 offset from the axis of rotation of the handle 901 which engages an inner surface 906*b* of each finger 906*a* and forces the lifter cam 906 to rotate. The handle is shown in FIGS. 8 and 10 broken away to reveal details of underlying elements, it is shown whole by dotted line. The remaining operation of impact wrench 900 is similar to that previously described with regard to impact wrench 800. However, since the cam lifter 906 of impact wrench 900 has three fingers 906*a*, each revolution of the handle 901 will produce three impacts. The number of fingers 806*a*, 906*a* on the lifter cams 806, 906 are shown by way of example only and not to limit the scope or spirit of the present invention, any number of such fingers 806*a*, 906*a* can be utilized, such as two fingers 1006*a* shown in the lifter cam 1006 of FIG. 12.

Figure 13:
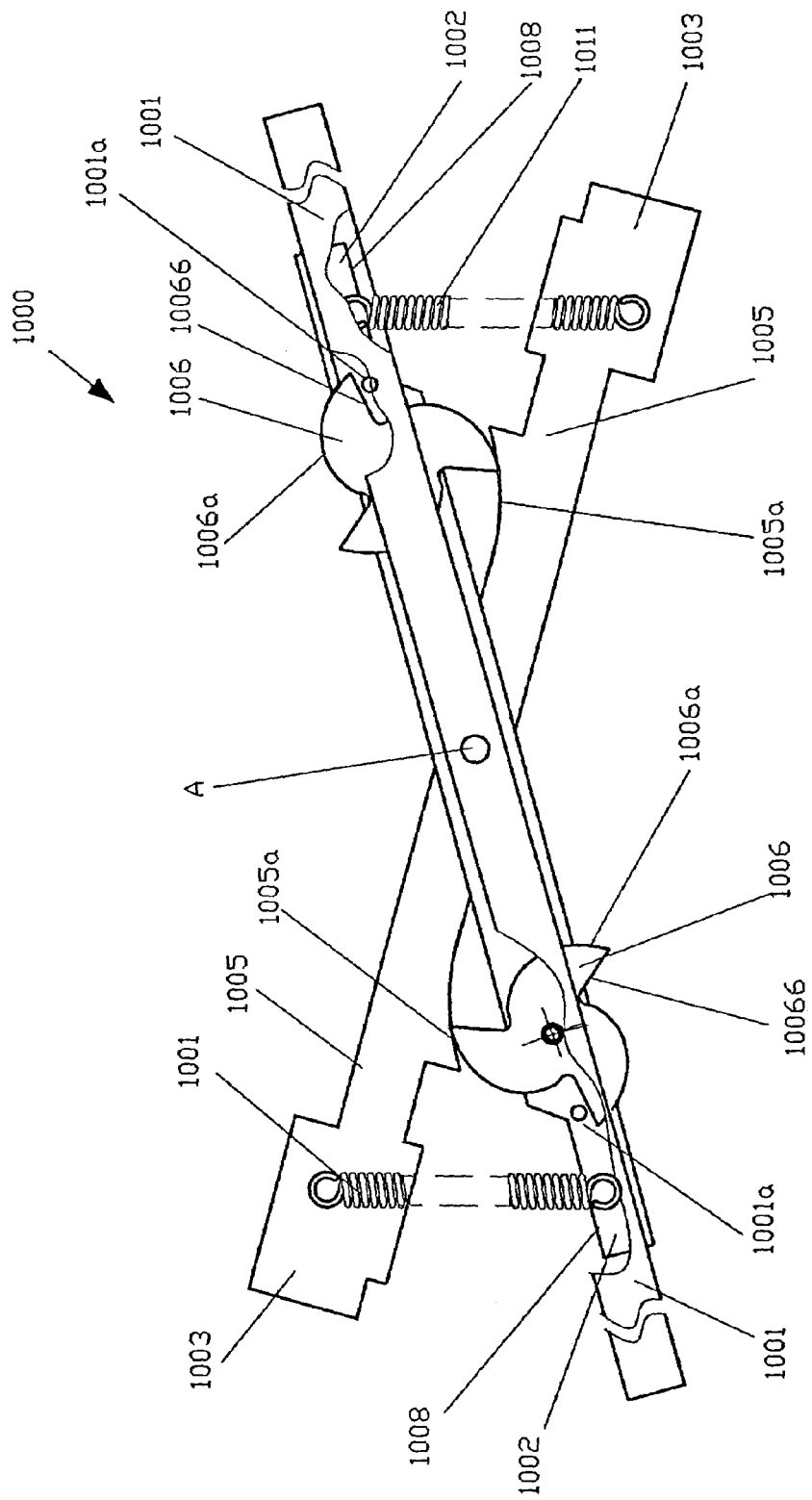
FIG. 13 illustrates a variation of the second embodiment of the impact wrench of FIG. 10 in which two near simultaneous impacts are produced.

Although a single impact mass 803, 903 and anvil surface 808, 908 combination is illustrated in FIGS. 8 and 10, it will be appreciated by those skilled in the art than one such combination may be utilized without departing from the scope or spirit of the present invention. FIG. 13 illustrates one such configuration of an impact wrench having two impact mass/anvil surface pairs, the impact wrench of FIG. 13 being generally referred to by reference numeral 1000. Impact wrench 1000 uses the arrangement of impact wrench 900 mirrored over the x and y axes to provide a configuration in which two impacts are produced nearly simultaneously. The simultaneous impacts can theoretically double the amount of impact produced or alternatively, the wrench can be scaled in half and produce the same impact as the impact wrench in FIG. 10.

Referring now to FIG. 13, where like numerals refer to similar features (e.g., handle 1001 is similar to handle 901 and 801) an impact wrench having multiple impact masses is illustrated therein, referred to generally by reference numeral 1000. Those skilled in the art will realize that impact wrench 1000 operates similarly to impact wrench 900 except that the handle 1001 has two pins 1001*a*, each of which engages an inner surface 1006*b* of a corresponding lifter cam 1006 to rotate the lifter cam 1006*b* such that fingers 1006*a* engage a corresponding cam surface 1005*a*. Such a motion rotates the driving member 1005 about point A to store energy in springs 1011. After the fingers 1006*a* pass the cam surface 1005*a*, the springs 1011 bias the impact masses 1003 to impact the anvil surfaces 1008 of the driven member 1002. Although, two cam lifters 1006 are shown, only one is necessary.

Figure 14B:
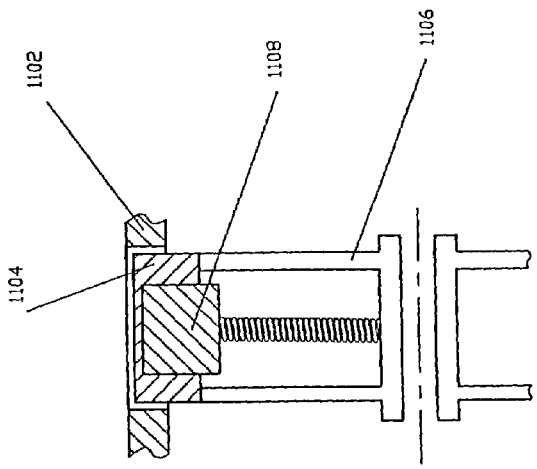
FIGS. 14A–14D illustrate a third embodiment of the impact wrench of the present invention.
Figure 14A:
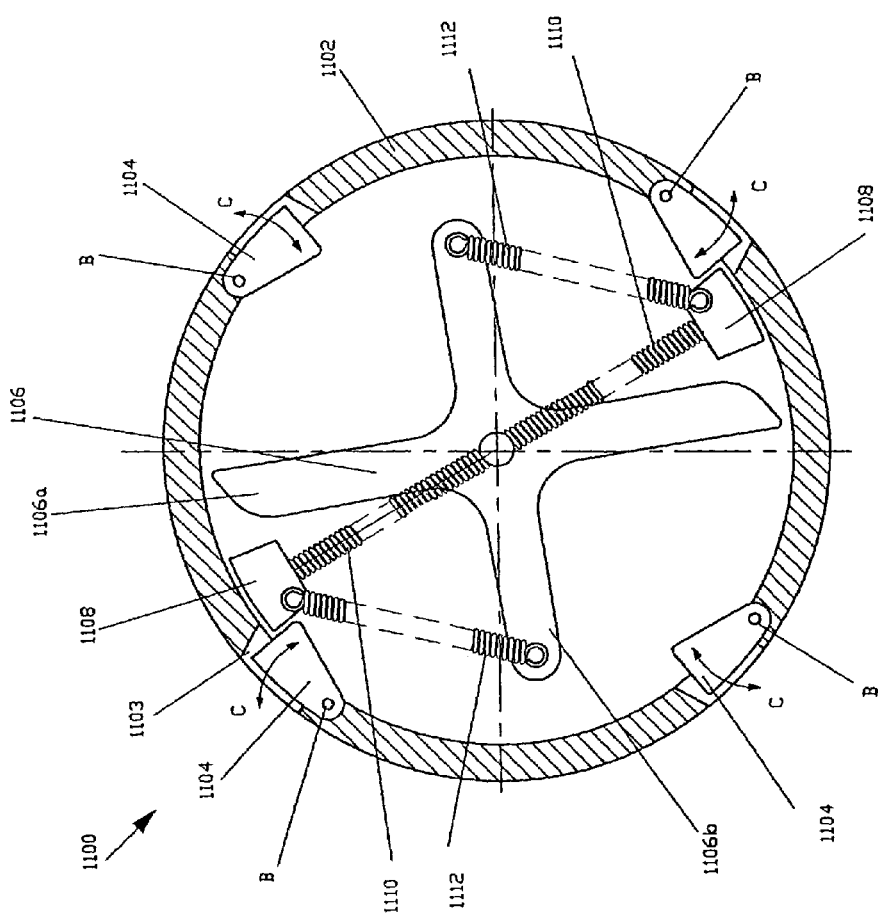
Figure 14C:
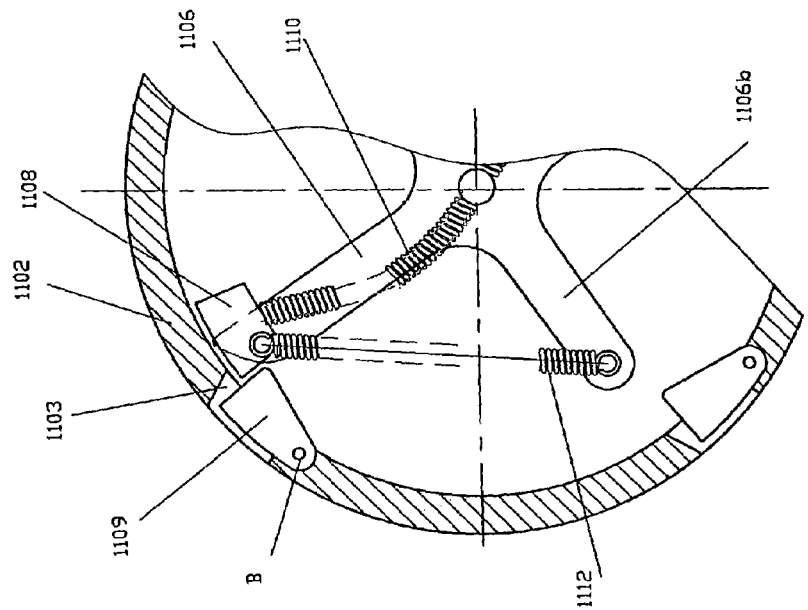
Figure 14D:
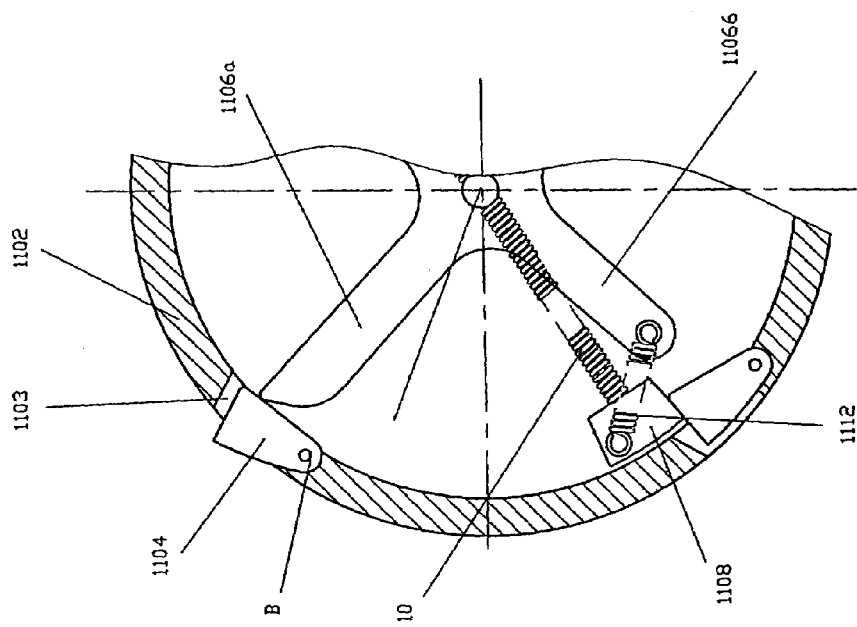

Referring now to FIGS. 14A–14D there is illustrated a third embodiment of the impact wrench of the present invention. The impact wrench being generally referred to by reference numeral 1100. Referring first to FIGS. 14A and 14B, the impact wrench 1100 includes a shell 1102 which is rigidly connected to a fastener (not shown) preferably with a lug or socket wrench (not shown). The fastener is preferably in line with center A and not offset therefrom. The shell 1102 has at least one and preferably a plurality of anvils 1104 rotatably disposed therein such that they rotate about points B in the directions of arrows C within windows 1103 cut in the wall of the shell 1102. Point B preferably includes a pinned joint. The anvils are biased inwards towards the center A preferably by a torsion spring (not shown) at point B. A handle (not shown) is rigidly attached to follower plates 1106, which rotate inside the shell 1102 as the handle is rotated. The follower plates 1106 have long arms 1106*a* which engage the anvils and pushes them outwards from the interior of the shell as shown in FIG. 14D. The follower plates also have short legs 1106*b* which clear the anvils 1104 and do not interfere with such when rotated inside the shell 1102 as is also shown in FIG. 14D. The follower plates 1106 preferably are the same width as the anvils 1104.

The impact wrench also includes impact masses 1108 offset from center A by a flexible material 1110 such as a leaf spring, extension spring, or a piece of spring steel with a curved cross section. One end of the flexible material is connected to the impact mass 1108 and the other end is connected to the handle or an extension thereof (such as the follower plate) so as to rotate with the rotation of the handle (and follower plate). As shown in FIG. 14B, the width of the impact mass 1108 is such that it fits between the follower plates 1106. Although not necessary, at least one further spring 1112 can be connected between each impact mass 1108 and a corresponding short leg 1106*b* of the follower plate 1106.

The operation of the impact wrench 1100 will now be described with regard to FIGS. 14A–14D. As the handle is rotated counterclockwise, the follower plate 1106 and impact masses 1108, being connected thereto also rotate counterclockwise. However, as shown in FIG. 14C, the rotation of the impact masses 1108 are blocked by a corresponding anvil surface 1104. Therefore, the flexible material 1110 will bend (and store energy) and the spring 1112 will stretch (also storing energy) until the long leg of the follower plate 1106a engages the anvil 1104 and push it out from the interior of the shell 1102 as shown in FIG. 14D. At which point the stored energy in the flexible material 1110 and spring 1112 will cause the impact mass 1108 to accelerate towards the next anvil surface 1102 (which has not been engaged by the short leg 1106b of the follower plate 1106 and thus not pushed from the shell). The impact mass 1108 will thus impact the anvil 1104 and transfer the impact to the shell 1102 and fastener connected thereto. Although only one impact mass 1108 is shown in FIGS. 14C and 14D, it is understood that two such masses impact a corresponding anvil simultaneously. Furthermore, the impact wrench can be designed with N anvils and N/2 simultaneous impacts.

Figure 15:
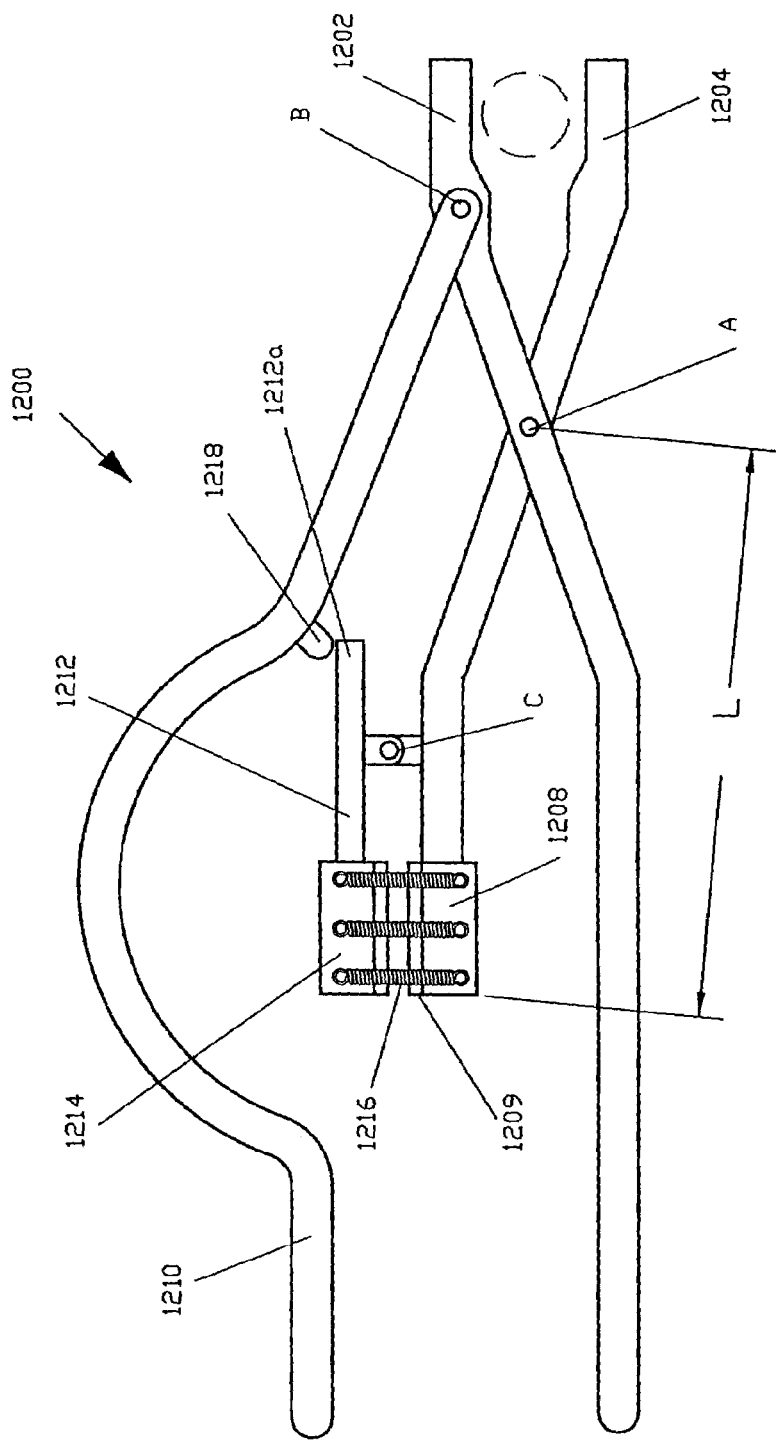
FIG. 15 illustrates a schematic illustration of a manually operated impact cutting tool.

Referring now to FIG. 15, there is shown a schematic representation of a manually operated impact cutting tool, for cutting wires, tree branches and the like. The impact cutting tool illustrated in FIG. 15 is generally referred to by reference numeral 1200. Cutting tool 1200 has first and second cutting jaws 1202, 1204 pivot about pivot point A. Cutting jaws 1202 and 1204 are configured as those well known in the art for cutting bolts, branches, wires and the like. The first cutting jaw 1202 is connected to a first handle 1206, while the second cutting jaw 1204 is connected to an impact handle 1208. Impact handle 1208 has an anvil surface 1209 at its free end. The first handle 1206 and impact handle 1208 pivot about point A to open and close the first and second cutting jaws 1202, 1204 relative to each other. Cutting tool 1200 further has a second handle 1210 pivotally connected to the first handle 1206 at pivot point B, which is offset from pivot point A. The cutting tool 1200 further has an impact mass member 1212 having an impact mass 1214 at one end thereof. The impact mass member 1212 is pivotably disposed on the impact handle 1208 about pivot point C. The impact mass 1214 is biased towards the anvil surface 1209 of the impact handle 1208, preferably by extension springs 1216. A projection 1218 is provided on the second handle 1210 to engage a free end 1212a of the impact mass member 1212.

The operation of the impact cutting tool will now be described with regard to FIG. 15. The first and second cutting jaws 1202, 1204 are opened relative to each other by spreading apart the first and second handles 1206, 1210 to permit the member (branch, wire, bolt, etc.) to be cut to be disposed therebetween. The first and second handles 1206, 1210 are then pushed towards each other to sandwich the member to be cut securely between the first and second cutting jaws 1202, 1204. After the member to be cut is within the first and second cutting jaws 1202, 1204, any further movement of the first and second handles 1206, 1210 towards each other will result in the projection 1218 engaging the free end 1212 of the impact mass member 1212 to rotate the same such that the impact mass 1214 moves away from the anvil surface 1209 against the biasing force of the springs 1216, to thus store energy in the springs 1216. Upon continued movement of the second handle 1210 towards the first handle 1206, the projection 1218 disengages with the free end 1212a of the impact mass member 1212 thus releasing the energy stored in the springs 1216 causing the impact mass 1214 to accelerate towards the anvil surface 1209 and impact the anvil surface 1209. The impact is transferred through the impact handle 1208 and to the second cutting jaw 1204 that impacts the member to be cut.

A ratcheting mechanism is preferably provided on the projection 1218 or free end 1212a to allow the second handle 1210 to be reset to begin another impact. A ratchet mechanism can also be provided at pivot point C such that the second handle 1210 can be "pumped" to build up a lot of energy in the springs 1216 before it is released to cause the impact. Although the longer the length L of the impact handle 1208, the greater the moment arm, and greater the impact transferred to the second cutting jaw 1204, if L is too long it will be flexible and will not efficiently transfer the impact. Therefore, there is a tradeoff between having a stiff impact handle 1208 and a long impact handle 1208. Those skilled in the art will realize that FIG. 15 represents a schematic illustration of an impact cutting tool, and that numerous configurations are possible to achieve the desired cutting impact.

Figure 16:
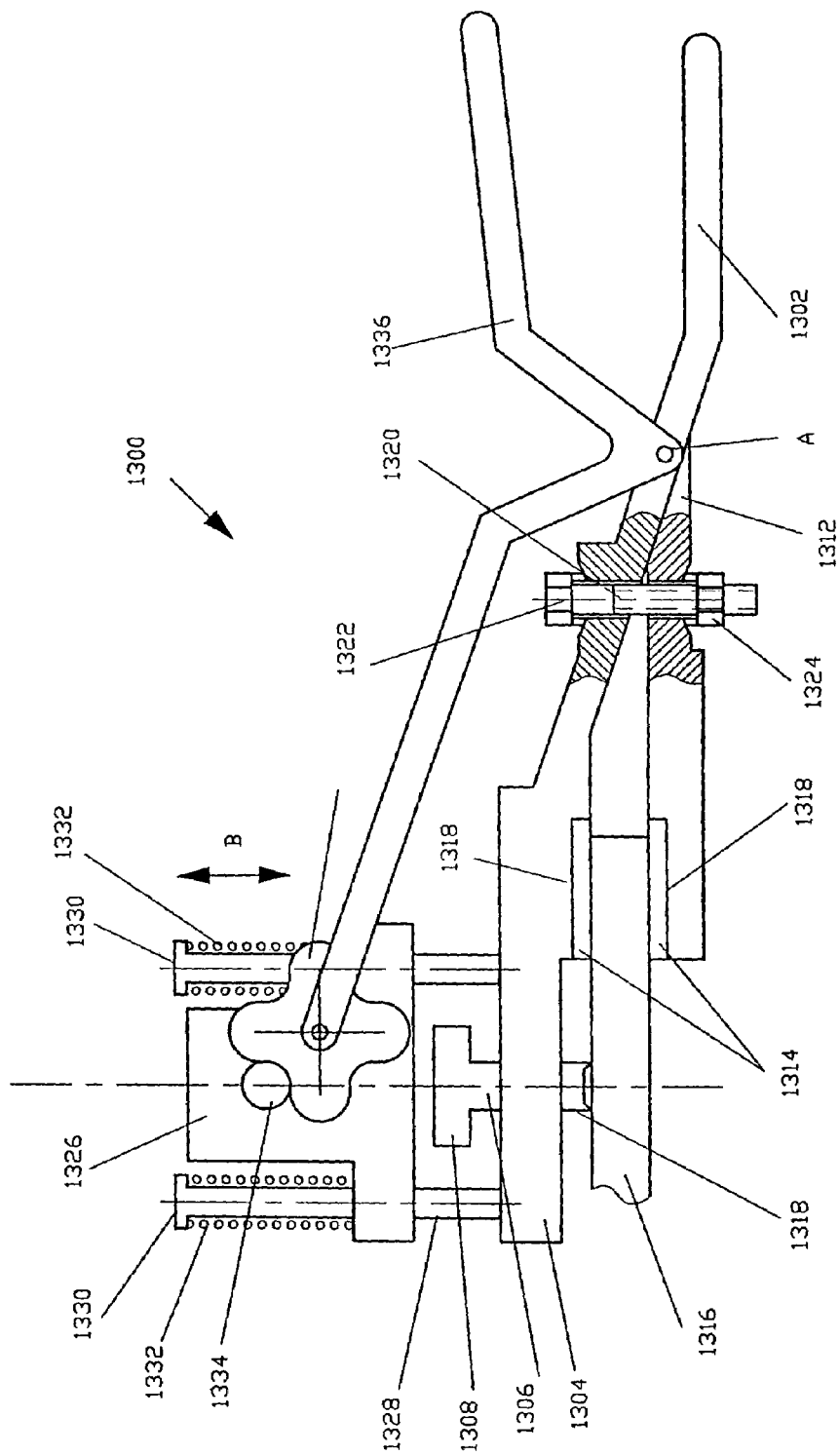
FIG. 16 illustrates a schematic illustration of a manually operated impact punching tool.

Referring now to FIG. 16, there is shown a schematic representation of a manually operated impact punch tool for cutting holes, notches etc, in sheet metal and other sheet materials. Impact punch is generally referred to by reference numeral 1300. Punch 1300 has a first handle 1302 with a sleeve 1304 at an end thereof for slidably retaining a punch 1306 therein. The punch 1306 has an anvil surface 1308 at one end and a punch edge 1310 at the other end. A clamp member 1312 is rotatably disposed on the first handle 1302 to pivot about point A. The first handle 1302 and clamp member 1312 have opposing surfaces 1314 to clamp a work piece 1316, such as sheet metal therebetween. The opposing surfaces preferably have an elastomer insert 1318 for gripping the work piece 1316. A screw 1320 is captured in the first handle by a ball tip 1322 and mates with a corresponding thread in the clamping member 1312. A knob 1324 is provided on the screw 1320, turning which acts to clamp or release the work piece 1316 between the opposing surfaces 1314.

An impact mass 1326 is provided on rails 1328 to slide freely along the directions of arrow B. The rails 1328 are fixed in the sleeve 1304 at one end and have a lip 1330 at another end for retaining compression springs 1332 between the lip 1330 and impact mass 1326. Although two rails are shown, four are preferred. The impact mass 1326 has a pin 1334 projecting from at least one side of the impact mass 1326. A second handle 1336 is also provided which pivots about point A. The second handle has a spur 1338 at one end thereof for engaging the pin 1334. The spur 1338 preferably has a ratchet mechanism which permits clockwise rotation of the spur 1338 and which locks the spur 1338 from rotating in a counterclockwise rotation.

The operation of the impact punch 1300 will now be described with regard to FIG. 16. The work piece 1316 is placed between the opposing surfaces 1314 and the punch 1306 is aligned with a center of a hole to be punched on the work piece 1316. After alignment, the knob 1324 is turned to clamp the work piece 1316 securely between the opposing surfaces 1314. The first and second handles 1302, 1336 are pressed towards each other, which lifts the impact mass 1326 against the bias of the springs 1332. When the spur 1338 disengages from the pin 1334 the impact mass 1326 accelerates towards the anvil surface 1308 and impacts the same. The impact is transferred to the cutting edge 1310 of the punch 1306, which punches a hole in the work piece. The cutting of the hole may occur in a single impact or after repeated impacts. After the impact, the second handle 1336 is lifted away from the first handle 1302 (either manually or by a biasing spring, not shown) such that the spur 1338 engages the pin 1334 and rotates clockwise back into an engagement position in which another impact can be initiated. A similar ratcheting spur and pin may be used at the projection 1218 and free end 1212*a* of the cutting tool 1200 described above.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A manually operated rotatable impact tool comprising:
   a driven member having means for retaining and driving a fastener about an axis, the driven member further having at least one anvil surface offset from the axis;
   a driving member rotatably connected to the driven member for driving the driven member about the axis to loosen or tighten the fastener, the driving member having at least one impact mass in cooperation with the at least one anvil surface;
   biasing means for biasing the at least one anvil surface and at least one impact mass together;
   at least one cam for engaging a surface of the driving member and for moving the at least one impact mass apart from the corresponding at least one anvil surface upon rotation of the cam and for releasing the driving member such that the biasing means pulls the at least one impact mass to impact the corresponding at least one anvil surface to create a torque around the axis;
   wherein the at least one cam comprises two cams, each rotatably disposed in the driven member and equally distanced from the axis, the at least one impact mass comprising two impact masses and the at least one anvil surface comprising two anvil surfaces, wherein each of the two cams corresponding with one of the two anvil surfaces and impact masses.

2. The manually operated rotatable impact tool of claim 1, wherein the cam has two or more cam surfaces each of which engages the surface of the driving member.

3. A manually operated rotatable impact tool comprising:
   a driven member having means for retaining and driving a fastener about an axis, the driven member farther having at least one anvil offset from the axis, the anvil being rotatably disposed in the driven member into and out from a path;
   a driving member rotatably connected to the driven member for driving the driven member about the axis to loosen or tighten the fastener;
   an impact mass movable along the path in communication with the at least one anvil;
   a flexible member connecting the driving member and impact mass for storing energy upon rotation of the driving member; and
   energy releasing means for releasing the stored energy and allowing it to be at least partially transferred to the impact mass such that the impact mass accelerates and strikes the at least one anvil upon the release of the stored energy while the at least one anvil is rotated into the path.

4. The manually operated rotatable impact tool of claim 3 wherein the at least one anvil comprises first and second anvils, each of the first and second anvils being rotatably disposed in the driven member into an out from the path, the impact mass being held against the first anvil upon rotation of the driving member due to a biasing force exerted by the flexible member, wherein the energy releasing means comprises a follower plate rotatably disposed in the driven member, the follower plate having at least one arm for engaging the first anvil and rotating the first anvil out from the path causing the impact mass to rotate and impact the second anvil.

5. The manually operated rotatable impact tool of claim 4, wherein the follower plate farther has at least one leg which when rotated does not interfere with the first and second anvils and farther comprising a spring connecting the leg to the impact mass for biasing the impact mass toward one of the first or second anvils.

6. The manually operated rotatable impact tool of claim 3, wherein the driven member comprises a shell having a wall, the at least one anvil being rotatably disposed in the wall.

7. The manually operated rotatable impact tool of claim 3, farther comprising a biasing means for biasing the at least one anvil into the path.

* * * * *